(12) United States Patent
Forstall et al.

(10) Patent No.: US 8,463,238 B2
(45) Date of Patent: Jun. 11, 2013

(54) MOBILE DEVICE BASE STATION

(75) Inventors: Scott Forstall, Mountain View, CA (US); Gregory N. Christie, San Jose, CA (US); Robert E. Borchers, Pleasanton, CA (US); Kevin Tiene, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1261 days.

(21) Appl. No.: 11/968,609

(22) Filed: Jan. 2, 2008

(65) Prior Publication Data

US 2009/0005005 A1    Jan. 1, 2009

Related U.S. Application Data

(60) Provisional application No. 60/946,788, filed on Jun. 28, 2007.

(51) Int. Cl.
*H04M 1/66* (2006.01)

(52) U.S. Cl.
USPC ....... 455/411; 455/426.1; 455/557; 455/41.2; 455/418; 455/456.4; 370/338

(58) Field of Classification Search
USPC .......... 455/426.1, 557, 41.2, 410–411, 456.4, 455/418–420, 456.3, 414.3; 370/328, 338
See application file for complete search history.

(56) References Cited

U.S. PATENT DOCUMENTS

| | | | |
|---|---|---|---|
| 4,644,351 A | 2/1987 | Zabarsky et al. | |
| 4,903,212 A | 2/1990 | Yokouchi et al. | |
| 5,031,104 A | 7/1991 | Ikeda et al. | |
| 5,067,081 A | 11/1991 | Person | |
| 5,182,555 A | 1/1993 | Sumner | |
| 5,187,810 A | 2/1993 | Toneyama et al. | |
| 5,195,031 A | 3/1993 | Ordish | |
| 5,243,652 A | 9/1993 | Teare | |
| 5,337,044 A | 8/1994 | Folger et al. | |
| 5,371,678 A | 12/1994 | Nomura | |
| 5,379,057 A | 1/1995 | Clough et al. | |
| 5,406,490 A | 4/1995 | Braegas | |
| 5,416,890 A | 5/1995 | Beretta | |
| 5,469,362 A | 11/1995 | Hunt et al. | |
| 5,519,760 A | 5/1996 | Borkowski et al. | |
| 5,523,950 A | 6/1996 | Peterson | |
| 5,537,460 A | 7/1996 | Holliday, Jr. et al. | |
| 5,539,395 A | 7/1996 | Buss | |

(Continued)

FOREIGN PATENT DOCUMENTS

| BR | 9904979 | 12/2000 |
|---|---|---|
| CA | 2163215 | 5/1994 |

(Continued)

OTHER PUBLICATIONS

U.S. Appl. No. 11/464,671, filed Aug. 15, 2006, Johnson.

(Continued)

*Primary Examiner* — Sharad Rampuria
(74) *Attorney, Agent, or Firm* — Gazdzinski & Associates, PC

(57) ABSTRACT

A mobile device can be configured as a base station to be used by other mobile devices and non-mobile devices to gain access to network services. The mobile device can be configured to provide and manage secure access to variety of networks (e.g., Wi-Fi, WiMax, Internet, cellular) and network services (e.g., map services, web services, syncing services).

19 Claims, 5 Drawing Sheets

U.S. PATENT DOCUMENTS

| | | |
|---|---|---|
| 5,539,647 A | 7/1996 | Shibata et al. |
| 5,552,989 A | 9/1996 | Bertrand |
| 5,559,520 A | 9/1996 | Barzegar et al. |
| 5,570,412 A | 10/1996 | LeBlanc |
| 5,598,572 A | 1/1997 | Tanikoshi et al. |
| 5,628,050 A | 5/1997 | McGraw |
| 5,636,245 A | 6/1997 | Ernst |
| 5,642,303 A | 6/1997 | Small |
| 5,675,362 A | 10/1997 | Clough et al. |
| 5,684,859 A | 11/1997 | Chanroo et al. |
| 5,689,252 A | 11/1997 | Ayanoglu et al. |
| 5,717,392 A | 2/1998 | Eldridge |
| 5,732,074 A | 3/1998 | Spaur et al. |
| 5,742,666 A | 4/1998 | Alpert |
| 5,745,865 A | 4/1998 | Rostoker et al. |
| 5,758,049 A | 5/1998 | Johnson et al. |
| 5,760,773 A | 6/1998 | Berman et al. |
| 5,767,795 A | 6/1998 | Schaphorst |
| 5,793,630 A | 8/1998 | Theimer |
| 5,835,061 A | 11/1998 | Stewart |
| 5,845,227 A | 12/1998 | Peterson |
| 5,867,110 A | 2/1999 | Naito et al. |
| 5,870,686 A | 2/1999 | Monson |
| 5,872,526 A | 2/1999 | Tognazzini |
| 5,883,580 A | 3/1999 | Briancon |
| 5,893,898 A | 4/1999 | Tanimoto |
| 5,898,680 A | 4/1999 | Johnstone |
| 5,905,451 A | 5/1999 | Sakashita |
| 5,908,465 A | 6/1999 | Ito et al. |
| 5,910,799 A | 6/1999 | Carpenter |
| 5,933,100 A | 8/1999 | Golding |
| 5,938,721 A | 8/1999 | Dussell et al. |
| 5,946,618 A | 8/1999 | Agre et al. |
| 5,948,041 A | 9/1999 | Abo et al. |
| 5,948,061 A | 9/1999 | Merriman et al. |
| 5,959,577 A | 9/1999 | Fan |
| 5,969,678 A | 10/1999 | Stewart |
| 5,987,381 A | 11/1999 | Oshizawa |
| 6,014,090 A | 1/2000 | Rosen et al. |
| 6,026,375 A | 2/2000 | Hall et al. |
| 6,064,335 A | 5/2000 | Eschenbach |
| 6,069,570 A | 5/2000 | Herring |
| 6,073,013 A | 6/2000 | Agre et al. |
| 6,073,062 A | 6/2000 | Hoshino et al. |
| 6,085,148 A | 7/2000 | Jamison |
| 6,091,956 A | 7/2000 | Hollenberg |
| 6,091,957 A | 7/2000 | Larkins |
| 6,101,443 A | 8/2000 | Kato |
| 6,111,541 A | 8/2000 | Karmel |
| 6,115,754 A | 9/2000 | Landgren |
| 6,119,014 A | 9/2000 | Alperovich et al. |
| 6,122,520 A | 9/2000 | Want et al. |
| 6,134,548 A | 10/2000 | Gottsman et al. |
| 6,138,142 A | 10/2000 | Linsk |
| 6,151,309 A | 11/2000 | Busuioc et al. |
| 6,166,627 A | 12/2000 | Reeley |
| 6,185,427 B1 | 2/2001 | Krasner et al. |
| 6,195,609 B1 | 2/2001 | Pilley et al. |
| 6,199,014 B1 | 3/2001 | Walker |
| 6,199,045 B1 | 3/2001 | Giniger et al. |
| 6,199,099 B1 | 3/2001 | Gershman et al. |
| 6,202,008 B1 | 3/2001 | Beckert et al. |
| 6,202,023 B1 | 3/2001 | Hancock et al. |
| 6,216,086 B1 | 4/2001 | Seymour et al. |
| 6,236,365 B1 | 5/2001 | LeBlanc et al. |
| 6,236,933 B1 | 5/2001 | Lang |
| 6,246,948 B1 | 6/2001 | Thakker |
| 6,252,544 B1 | 6/2001 | Hoffberg |
| 6,256,498 B1 | 7/2001 | Ludwig |
| 6,259,405 B1 | 7/2001 | Stewart et al. |
| 6,266,614 B1 | 7/2001 | Alumbaugh |
| 6,266,615 B1 | 7/2001 | Jin |
| 6,278,884 B1 | 8/2001 | Kim |
| 6,298,306 B1 | 10/2001 | Suarez et al. |
| 6,321,158 B1 | 11/2001 | DeLorme et al. |
| 6,323,846 B1 | 11/2001 | Westerman et al. |
| 6,324,692 B1 | 11/2001 | Fiske |
| 6,326,918 B1 | 12/2001 | Stewart |
| 6,343,317 B1 | 1/2002 | Glorikian |
| 6,345,288 B1 | 2/2002 | Reed et al. |
| 6,353,398 B1 | 3/2002 | Amin et al. |
| 6,353,743 B1 | 3/2002 | Karmel |
| 6,353,837 B1 | 3/2002 | Blumenau |
| 6,356,761 B1 | 3/2002 | Huttunen |
| 6,370,629 B1 | 4/2002 | Hastings et al. |
| 6,377,886 B1 | 4/2002 | Gotou |
| 6,401,032 B1 | 6/2002 | Jamison |
| 6,405,123 B1 | 6/2002 | Rennar et al. |
| 6,414,635 B1 | 7/2002 | Stewart et al. |
| 6,415,227 B1 | 7/2002 | Lin |
| 6,452,498 B2 | 9/2002 | Stewart |
| 6,456,234 B1 | 9/2002 | Johnson |
| 6,477,581 B1 | 11/2002 | Carpenter |
| 6,490,519 B1 | 12/2002 | Lapidot et al. |
| 6,501,421 B1 | 12/2002 | Dutta et al. |
| 6,505,046 B1 | 1/2003 | Baker |
| 6,505,123 B1 | 1/2003 | Root et al. |
| 6,564,143 B1 | 5/2003 | Alewine et al. |
| 6,570,557 B1 | 5/2003 | Westerman et al. |
| 6,571,279 B1 | 5/2003 | Herz et al. |
| 6,574,484 B1 | 6/2003 | Carley |
| 6,587,835 B1 | 7/2003 | Treyz et al. |
| 6,611,687 B1 | 8/2003 | Clark et al. |
| 6,615,131 B1 | 9/2003 | Rennard et al. |
| 6,615,213 B1 | 9/2003 | Johnson |
| 6,647,257 B2 | 11/2003 | Owensby |
| 6,677,894 B2 | 1/2004 | Sheynblat et al. |
| 6,679,932 B2 | 1/2004 | Birler et al. |
| 6,681,120 B1 | 1/2004 | Kim |
| 6,697,018 B2 | 2/2004 | Stewart |
| 6,711,474 B1 | 3/2004 | Treyz et al. |
| 6,731,236 B1 | 5/2004 | Hager et al. |
| 6,731,238 B2 | 5/2004 | Johnson |
| 6,741,188 B1 | 5/2004 | Miller et al. |
| 6,748,318 B1 | 6/2004 | Jones |
| 6,759,960 B2 | 7/2004 | Stewart |
| 6,795,686 B2 | 9/2004 | Master et al. |
| 6,810,323 B1 | 10/2004 | Bullock et al. |
| 6,816,782 B1 | 11/2004 | Walters et al. |
| 6,845,318 B1 | 1/2005 | Moore et al. |
| 6,847,891 B2 | 1/2005 | Pietras et al. |
| 6,853,911 B1 | 2/2005 | Sakarya |
| 6,853,917 B2 | 2/2005 | Miwa |
| 6,868,074 B1 | 3/2005 | Hanson |
| 6,888,536 B2 | 5/2005 | Westerman et al. |
| 6,912,398 B1 | 6/2005 | Domnitz |
| 6,944,447 B2 | 9/2005 | Portman et al. |
| 6,948,656 B2 | 9/2005 | Williams |
| 6,952,181 B2 | 10/2005 | Karr et al. |
| 6,954,735 B1 | 10/2005 | Djupsjobacka et al. |
| 6,975,959 B2 | 12/2005 | Dietrich et al. |
| 6,980,909 B2 | 12/2005 | Root et al. |
| 7,009,556 B2 | 3/2006 | Stewart |
| 7,044,372 B2 | 5/2006 | Okuda et al. |
| 7,058,594 B2 | 6/2006 | Stewart |
| 7,082,365 B2 | 7/2006 | Sheha et al. |
| 7,096,030 B2 | 8/2006 | Huomo |
| 7,103,470 B2 | 9/2006 | Mintz |
| 7,117,015 B2 | 10/2006 | Scheinert et al. |
| 7,123,189 B2 | 10/2006 | Lalik et al. |
| 7,165,725 B2 | 1/2007 | Casey |
| 7,187,997 B2 | 3/2007 | Johnson |
| 7,256,711 B2 | 8/2007 | Sheha et al. |
| 7,257,392 B2 | 8/2007 | Tang et al. |
| 7,298,327 B2 | 11/2007 | Dupray et al. |
| 7,310,516 B1 | 12/2007 | Vacanti |
| 7,339,496 B2 | 3/2008 | Endo et al. |
| 7,343,564 B2 | 3/2008 | Othmer |
| 7,349,706 B2 | 3/2008 | Kim et al. |
| 7,359,713 B1 | 4/2008 | Tiwari |
| 7,370,283 B2 | 5/2008 | Othmer |
| 7,386,396 B2 | 6/2008 | Johnson |
| 7,427,021 B2 | 9/2008 | Kemper et al. |
| 7,500,607 B2 | 3/2009 | Williams |
| 7,525,484 B2 | 4/2009 | Dupray et al. |
| 2001/0018349 A1 | 8/2001 | Kinnunen et al. |
| 2002/0035493 A1 | 3/2002 | Mozayeny et al. |

| | | |
|---|---|---|
| 2002/0035609 A1 | 3/2002 | Lessard et al. |
| 2002/0042266 A1 | 4/2002 | Heyward et al. |
| 2002/0046069 A1 | 4/2002 | Mozayeny et al. |
| 2002/0046077 A1 | 4/2002 | Mozayeny et al. |
| 2002/0046084 A1 | 4/2002 | Steele et al. |
| 2002/0091991 A1 | 7/2002 | Castro |
| 2002/0140560 A1 | 10/2002 | Altman et al. |
| 2002/0160815 A1 | 10/2002 | Patel et al. |
| 2002/0167442 A1 | 11/2002 | Taylor |
| 2003/0069683 A1 | 4/2003 | Lapidot et al. |
| 2003/0100326 A1 | 5/2003 | Grube et al. |
| 2003/0101225 A1 | 5/2003 | Han et al. |
| 2003/0134657 A1 | 7/2003 | Norta et al. |
| 2003/0144793 A1 | 7/2003 | Melaku et al. |
| 2003/0236106 A1 | 12/2003 | Master et al. |
| 2004/0036649 A1 | 2/2004 | Taylor |
| 2004/0054428 A1 | 3/2004 | Sheha et al. |
| 2004/0082351 A1* | 4/2004 | Westman .................. 455/518 |
| 2004/0128067 A1 | 7/2004 | Smith |
| 2004/0151151 A1 | 8/2004 | Kubler et al. |
| 2004/0158401 A1 | 8/2004 | Yoon |
| 2004/0158584 A1 | 8/2004 | Necsoiu et al. |
| 2004/0172409 A1 | 9/2004 | James |
| 2004/0176907 A1 | 9/2004 | Nesbitt |
| 2004/0198379 A1 | 10/2004 | Magee et al. |
| 2004/0203836 A1 | 10/2004 | Gorday et al. |
| 2004/0203909 A1 | 10/2004 | Koster |
| 2004/0228330 A1 | 11/2004 | Kubler et al. |
| 2004/0236504 A1 | 11/2004 | Bickford et al. |
| 2004/0242149 A1 | 12/2004 | Luneau |
| 2004/0246940 A1 | 12/2004 | Kubler et al. |
| 2004/0248586 A1 | 12/2004 | Patel et al. |
| 2004/0260939 A1 | 12/2004 | Ichikawa et al. |
| 2004/0264442 A1 | 12/2004 | Kubler et al. |
| 2005/0002419 A1 | 1/2005 | Doviak et al. |
| 2005/0004838 A1 | 1/2005 | Perkowski et al. |
| 2005/0027442 A1 | 2/2005 | Kelley et al. |
| 2005/0085272 A1 | 4/2005 | Anderson et al. |
| 2005/0096840 A1 | 5/2005 | Simske |
| 2005/0114021 A1 | 5/2005 | Krull et al. |
| 2005/0149250 A1 | 7/2005 | Isaac |
| 2005/0153681 A1 | 7/2005 | Hanson |
| 2005/0197767 A1 | 9/2005 | Nortrup |
| 2005/0221808 A1 | 10/2005 | Karlsson et al. |
| 2005/0221843 A1 | 10/2005 | Friedman et al. |
| 2005/0222756 A1 | 10/2005 | Davis et al. |
| 2005/0227709 A1 | 10/2005 | Chang et al. |
| 2005/0228860 A1 | 10/2005 | Hamynen et al. |
| 2005/0239477 A1 | 10/2005 | Kim et al. |
| 2005/0250440 A1 | 11/2005 | Zhou et al. |
| 2005/0286421 A1 | 12/2005 | Janacek |
| 2006/0015249 A1 | 1/2006 | Gieseke |
| 2006/0022048 A1 | 2/2006 | Johnson |
| 2006/0025158 A1 | 2/2006 | Leblanc et al. |
| 2006/0041377 A1 | 2/2006 | Jung et al. |
| 2006/0041378 A1 | 2/2006 | Cheng et al. |
| 2006/0058955 A1 | 3/2006 | Mehren |
| 2006/0085392 A1 | 4/2006 | Wang et al. |
| 2006/0094353 A1 | 5/2006 | Neilson et al. |
| 2006/0111122 A1 | 5/2006 | Carlsan et al. |
| 2006/0172769 A1* | 8/2006 | Oh .................. 455/557 |
| 2006/0180649 A1 | 8/2006 | Casey |
| 2006/0184978 A1 | 8/2006 | Casey |
| 2006/0195481 A1 | 8/2006 | Arrouye et al. |
| 2006/0202819 A1 | 9/2006 | Adamczyk et al. |
| 2006/0211453 A1 | 9/2006 | Schick |
| 2006/0218209 A1 | 9/2006 | Arrouye et al. |
| 2006/0229802 A1 | 10/2006 | Vertelney et al. |
| 2006/0284767 A1 | 12/2006 | Taylor |
| 2006/0287824 A1 | 12/2006 | Lin |
| 2007/0001875 A1 | 1/2007 | Taylor |
| 2007/0005188 A1 | 1/2007 | Johnson |
| 2007/0005233 A1 | 1/2007 | Pinkus et al. |
| 2007/0010942 A1 | 1/2007 | Bill |
| 2007/0016362 A1 | 1/2007 | Nelson |
| 2007/0042790 A1 | 2/2007 | Mohi et al. |
| 2007/0055684 A1 | 3/2007 | Stevens |
| 2007/0061245 A1 | 3/2007 | Ramer et al. |
| 2007/0061363 A1 | 3/2007 | Ramer et al. |
| 2007/0073480 A1 | 3/2007 | Singh |
| 2007/0073719 A1 | 3/2007 | Ramer et al. |
| 2007/0082655 A1* | 4/2007 | Link et al. .................. 455/410 |
| 2007/0083470 A1* | 4/2007 | Bonner et al. .................. 705/51 |
| 2007/0093258 A1 | 4/2007 | Steenstra et al. |
| 2007/0106465 A1 | 5/2007 | Adam et al. |
| 2007/0115868 A1 | 5/2007 | Chen et al. |
| 2007/0117451 A1 | 5/2007 | Yokoyama |
| 2007/0124043 A1 | 5/2007 | Ayoub et al. |
| 2007/0124066 A1 | 5/2007 | Kikuchi |
| 2007/0129888 A1 | 6/2007 | Rosenberg |
| 2007/0130153 A1 | 6/2007 | Nachman et al. |
| 2007/0135136 A1 | 6/2007 | Ische |
| 2007/0135990 A1 | 6/2007 | Seymour et al. |
| 2007/0149212 A1 | 6/2007 | Gupta et al. |
| 2007/0150320 A1 | 6/2007 | Huang |
| 2007/0153983 A1 | 7/2007 | Bloebaum et al. |
| 2007/0153984 A1 | 7/2007 | Bloebaum et al. |
| 2007/0153986 A1 | 7/2007 | Bloebaum et al. |
| 2007/0156326 A1 | 7/2007 | Nesbitt |
| 2007/0179854 A1 | 8/2007 | Ziv et al. |
| 2007/0204218 A1 | 8/2007 | Weber et al. |
| 2007/0206730 A1 | 9/2007 | Polk |
| 2007/0219706 A1 | 9/2007 | Sheynblat |
| 2007/0232326 A1 | 10/2007 | Johnson |
| 2007/0233387 A1 | 10/2007 | Johnson |
| 2007/0254676 A1 | 11/2007 | Pedigo et al. |
| 2007/0260751 A1 | 11/2007 | Meesseman |
| 2007/0271328 A1 | 11/2007 | Geelen et al. |
| 2007/0276586 A1 | 11/2007 | Jeon et al. |
| 2007/0276587 A1 | 11/2007 | Johnson |
| 2007/0276596 A1 | 11/2007 | Solomon et al. |
| 2007/0282521 A1 | 12/2007 | Broughton |
| 2007/0299601 A1 | 12/2007 | Zhao et al. |
| 2008/0004802 A1 | 1/2008 | Horvitz |
| 2008/0005104 A1 | 1/2008 | Flake et al. |
| 2008/0005301 A1 | 1/2008 | Li et al. |
| 2008/0015422 A1 | 1/2008 | Wessel |
| 2008/0021632 A1 | 1/2008 | Amano |
| 2008/0024360 A1 | 1/2008 | Taylor |
| 2008/0024364 A1 | 1/2008 | Taylor |
| 2008/0027636 A1 | 1/2008 | Tengler et al. |
| 2008/0030308 A1 | 2/2008 | Johnson |
| 2008/0032703 A1 | 2/2008 | Krumm et al. |
| 2008/0045234 A1 | 2/2008 | Reed |
| 2008/0052407 A1 | 2/2008 | Baudino et al. |
| 2008/0070593 A1 | 3/2008 | Altman et al. |
| 2008/0071466 A1 | 3/2008 | Downs et al. |
| 2008/0082254 A1 | 4/2008 | Huhtala et al. |
| 2008/0085727 A1 | 4/2008 | Kratz |
| 2008/0086240 A1 | 4/2008 | Breed |
| 2008/0091347 A1 | 4/2008 | Tashiro |
| 2008/0097698 A1 | 4/2008 | Arnold-Huyser et al. |
| 2008/0098090 A1 | 4/2008 | Geraci et al. |
| 2008/0104634 A1 | 5/2008 | Gajdos et al. |
| 2008/0109153 A1 | 5/2008 | Gueziec |
| 2008/0113672 A1 | 5/2008 | Karr et al. |
| 2008/0129528 A1 | 6/2008 | Guthrie |
| 2008/0132243 A1 | 6/2008 | Spalink et al. |
| 2008/0132251 A1 | 6/2008 | Altman et al. |
| 2008/0132252 A1 | 6/2008 | Altman et al. |
| 2008/0140308 A1 | 6/2008 | Yamane et al. |
| 2008/0140520 A1 | 6/2008 | Hyder et al. |
| 2008/0153512 A1 | 6/2008 | Kale et al. |
| 2008/0153513 A1 | 6/2008 | Flake et al. |
| 2008/0155453 A1 | 6/2008 | Othmer |
| 2008/0161034 A1 | 7/2008 | Akiyama |
| 2008/0167083 A1 | 7/2008 | Wyld et al. |
| 2008/0167811 A1 | 7/2008 | Geelen |
| 2008/0172173 A1 | 7/2008 | Chang et al. |
| 2008/0172374 A1 | 7/2008 | Wolosin et al. |
| 2008/0176545 A1 | 7/2008 | Dicke et al. |
| 2008/0177793 A1 | 7/2008 | Epstein et al. |
| 2008/0189033 A1 | 8/2008 | Geelen et al. |
| 2008/0249667 A1 | 10/2008 | Horvitz et al. |
| 2008/0271072 A1 | 10/2008 | Rothschild et al. |
| 2008/0318550 A1 | 12/2008 | DeAtley |
| 2009/0003659 A1 | 1/2009 | Forstall et al. |
| 2009/0005018 A1 | 1/2009 | Forstall et al. |

| | | | |
|---|---|---|---|
| 2009/0005021 A1 | 1/2009 | Forstall et al. | |
| 2009/0005068 A1 | 1/2009 | Forstall et al. | |
| 2009/0005070 A1 | 1/2009 | Forstall et al. | |
| 2009/0005071 A1 | 1/2009 | Forstall et al. | |
| 2009/0005072 A1 | 1/2009 | Forstall et al. | |
| 2009/0005076 A1 | 1/2009 | Forstall et al. | |
| 2009/0005080 A1 | 1/2009 | Forstall et al. | |
| 2009/0005082 A1 | 1/2009 | Forstall et al. | |
| 2009/0005964 A1 | 1/2009 | Forstall et al. | |
| 2009/0005965 A1 | 1/2009 | Forstall et al. | |
| 2009/0005975 A1 | 1/2009 | Forstall et al. | |
| 2009/0005978 A1 | 1/2009 | Forstall et al. | |
| 2009/0005981 A1 | 1/2009 | Forstall et al. | |
| 2009/0006336 A1 | 1/2009 | Forstall et al. | |
| 2009/0017790 A1* | 1/2009 | Thalapaneni et al. | 455/410 |
| 2009/0030605 A1 | 1/2009 | Breed | |
| 2009/0031006 A1 | 1/2009 | Johnson | |
| 2009/0033540 A1 | 2/2009 | Breed et al. | |
| 2009/0058822 A1* | 3/2009 | Chaudhri | 345/173 |
| 2009/0089706 A1 | 4/2009 | Furches et al. | |
| 2009/0098857 A1 | 4/2009 | DeAtley | |
| 2009/0177385 A1 | 7/2009 | Matas et al. | |
| 2009/0247122 A1* | 10/2009 | Fitzgerald et al. | 455/410 |
| 2009/0259573 A1 | 10/2009 | Cheng et al. | |
| 2009/0271271 A1 | 10/2009 | Johnson | |
| 2009/0281724 A1 | 11/2009 | Blumenberg et al. | |
| 2009/0286549 A1 | 11/2009 | Sazegari et al. | |

FOREIGN PATENT DOCUMENTS

| | | |
|---|---|---|
| CA | 2287596 | 4/2000 |
| CA | 2432239 | 12/2004 |
| DE | 4437360 | 4/1996 |
| DE | 19506890 | 8/1996 |
| DE | 19914257 | 3/1999 |
| DE | 10 141 695 | 3/2003 |
| EP | 785535 | 7/1997 |
| EP | 0 809 117 | 11/1997 |
| EP | 0 699 330 | 4/1998 |
| EP | 0 908 835 | 4/1999 |
| EP | 0 997 808 | 5/2000 |
| EP | 1 300 652 | 4/2003 |
| EP | 1 457 928 | 9/2004 |
| EP | 1 469 287 | 10/2004 |
| EP | 1 496 338 | 1/2005 |
| EP | 1 770 956 | 9/2005 |
| EP | 1 465 041 | 2/2006 |
| EP | 1 659 817 | 5/2006 |
| EP | 1 790 947 | 5/2007 |
| EP | 1 860 904 | 11/2007 |
| FR | 2730083 | 8/1996 |
| FR | 2272911 | 6/1999 |
| FR | 2810183 | 12/2001 |
| GB | 2 359 888 | 5/2001 |
| GB | 2 407 230 | 4/2005 |
| JP | 62142215 | 6/1987 |
| JP | 05-071974 | 3/1993 |
| JP | 06-525189 | 5/1994 |
| JP | 2007-221433 | 5/1994 |
| JP | 9-062993 | 7/1997 |
| JP | 9-210710 | 8/1997 |
| JP | 11-234736 | 8/1999 |
| JP | 2000-163379 | 6/2000 |
| JP | 2001-160063 | 6/2001 |
| JP | 2002-310680 | 10/2002 |
| JP | 10-030933 | 2/2003 |
| JP | 2003-228532 | 8/2003 |
| JP | 2004-045054 | 2/2004 |
| JP | 2004-219146 | 7/2004 |
| JP | 2004-362271 | 12/2004 |
| JP | 2005-106741 | 4/2005 |
| JP | 2005-182146 | 7/2005 |
| JP | 2005-241519 | 9/2005 |
| JP | 2006-112338 | 4/2006 |
| JP | 2006-184007 | 7/2006 |
| JP | 2006-270889 | 10/2006 |
| JP | 2006-279838 | 10/2006 |
| JP | 2007-033220 | 2/2007 |
| JP | 2007-033331 | 2/2007 |
| JP | 2007-033368 | 2/2007 |
| JP | 2007-127439 | 5/2007 |
| JP | 2007-147439 | 6/2007 |
| JP | 2007-201699 | 8/2007 |
| JP | 2007-240400 | 9/2007 |
| JP | 2007-259291 | 10/2007 |
| JP | 2007-271299 | 10/2007 |
| JP | 2007-304009 | 11/2007 |
| JP | 2008-058917 | 3/2008 |
| JP | 2008-129774 | 6/2008 |
| KR | 2004-102440 | 12/2004 |
| KR | 2005-096746 | 10/2005 |
| TW | 200426387 | 12/2004 |
| WO | WO 93/20546 | 10/1993 |
| WO | WO 97/07467 | 2/1997 |
| WO | WO 97/24577 | 7/1997 |
| WO | WO 98/03951 | 1/1998 |
| WO | WO 98/07112 | 2/1998 |
| WO | WO 98/54682 | 12/1998 |
| WO | WO 99/16036 | 4/1999 |
| WO | WO 99/44183 | 9/1999 |
| WO | WO 01/37597 | 5/2001 |
| WO | WO 02/054813 | 7/2002 |
| WO | WO 03/023593 | 3/2003 |
| WO | WO 03/096055 | 11/2003 |
| WO | WO 2004/008792 | 1/2004 |
| WO | WO 2004/021730 | 3/2004 |
| WO | WO 2004/061576 | 7/2004 |
| WO | WO 2004/076977 | 9/2004 |
| WO | WO 2005/006258 | 1/2005 |
| WO | WO 2006/065856 | 6/2006 |
| WO | WO 2006/113125 | 10/2006 |
| WO | WO 2007/052285 | 5/2007 |
| WO | WO 2008/051929 | 5/2008 |
| WO | WO 2008/085740 | 7/2008 |
| WO | WO 2009/140031 | 11/2009 |

OTHER PUBLICATIONS

U.S. Appl. No. 12/044,363, filed Mar. 37, 2008, Johnson.
"New program for mobile blogging for Pocket PC released: My Blog," [online] [Retrieved on Apr. 5, 2006]; Retrieved from the Internet URL: http://msmobiles.com/news.php/4067.html; 1 page.
"Numbering and Dialing Plan Within the United States," *Alliance for Telecommunications Industry Solutions*, 2005, 17 pages.
Dalrymple, "Google Maps adds locator, but not for iPhone," [online] [Retrieved Nov. 30, 2007]; Retrieved from the Internet URL: http://news.yahoo.com/s/macworld/20071130/tc_macworld/googlemaps20071130_0&printer=1;_ylt=Auvf3s6LQK_pOaJlb954T_DQn6gB; 1 page.
Maxwell et al., "Alfred: The Robot Waiter Who Remembers You," *AAAI Technical Report WS-99-15*, 1999, 12 pages.
Shibata et al., "Development and Integration of Generic Components for a Teachable Vision-Based Mobile Robot," *IEEE/ASME Transactions on Mechatronics*, 1996, 1(3):230-236.
Wu et al., "A Multimedia System for Route Sharing and Video-Based Navigation," *IEEE*, 2006, pp. 73-76.
Yogesh C. Rathod, Third Party Submission in U.S. Appl. No. 12/233,358 mailed Mar. 30, 2010, 12 pages.
Feddema et al., "Cooperative Sentry Vehicles and Differential GPS Leapfrog," 2000, United States Department of Energy, pp. 1-12.
U.S. Appl. No. 11/827,065, filed Jul. 10, 2007, Johnson.
U.S. Appl. No. 11/972,559, filed Jan. 10, 2008, Alten.
U.S. Appl. No. 12/044,363, filed Mar. 7, 2008, Johnson.
U.S. Appl. No. 11/114,714, filed May 2, 2008, Williamson et al.
U.S. Appl. No. 12/119,316, filed May 12, 2008, Blumenberg et al.
U.S. Appl. No. 12/122,339, filed May 16, 2008, Sazegari et al.
U.S. Appl. No. 12/233,358, filed Sep. 18, 2008, Low et al.
U.S. Appl. No. 12/270,814, filed Nov. 13, 2008, Herz.
"27 Countries in your pocket"; [online] [Retrieved on Sep. 29, 2005] Retrieved from the Internet <URL: http://www.mio-tech.be/en/printview/press-releases-2005-09-29.htm; 1 page.
"Animated Transition"; [online] [Retrieved on Oct. 16, 2006] Retrieved from the Internet <URL: http://designinterfaces.com/Animated_Transition; 2 pages.
"DaimlerCrysler Guide5 Usecases Overview Map", 1 page (no reference date).

"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.

"Mio 269+ Users Manula"; 2005; 44 pages.

Review Guide—Google Maps for mobile (beta); Google; 2006; 7 pages.

"User-centered design of mobile solutions", NAMAHN, 2006, 18 pages.

"User's Manual MioMap 2.0"; Aug. 2005; 60 pages.

"Windows Live Search for Mobile Goes Final, Still Great"; [online] [Retrieved on Mar. 11, 2007]; Retrieved from the Internet, URL: http://gizmodo.com/gadgets/software/windows-live-search-for-mobile-goes-final-still-great-236002.php; 3 pages.

"Windows Mobile 6 Professional Video Tour"; [online] [Retrieved on Mar. 11, 2007]; Retrieved from the Internet, URL: http://gizmodo.com/gadgets/cellphones/windows-mobile-6-professional-video-tour-237039.php; 4 pages.

"Windows Mobile"; Microsoft; 2007, 2 pages.

Anand et al., "Quantitative Analysis of Power Consumption for Location-Aware Applications on Smart Phones", IEEE International Symposium on Industrial Electronics, 2007.

Beard et al., "Estimating Positions and Paths of Moving Objects", IEEE 2000, pp. 1-8.

Bederson, B.B., Audio Augmented Reality: A Prototype Automated Tour Guide [online] [retrieved on Aug. 30, 2002] [retrieved from http://www.cs.umd.edu/~bederson/papers/chi-95-aar/] pp. 1-4.

Berman et al., "The Role of Dead Reckoning and Inertial Sensors in Future General Aviation Navigation", IEEE, 1998, pp. 510-517.

Bevly et al., "Cascaded Kalman Filters for Accurate Estimation of Multiple Biases, Dead-Reckoning Navigation, and Full State Feedback Control of Ground Vehicles", IEEE Transactions on Control Systems in Technology, vol. 15, No. 2, Mar. 2007, pp. 199-208.

Binzhuo et al., "Mobile Phone GIS Based on Mobile SVG", IEEE 2005.

Bokharouss et al., "A Location-Aware Mobile Call Handling Assistant", International Conference on Advanced Information Networking and Applications Workshops, 2007.

Boonsrimuang et al., "Mobile Internet Navigation System", IEEE, 2002, pp. 325-328.

Camp et al., "A computer-based method for predicting transit time systems", Decsision Sciences, vol. 5, pp. 339-346, 1974.

Carew; "Phones that tell you where to drive, meet, eat"; [online] [Retrieved May 26, 2007]; Retrieved from the Internet <URL htttp://news.yahoo.com/s/nm/20070525/wr_nm/column_pluggedin_dc_2&printer=1;_ylt=Ahqaftn7xm1S2r0FZFeu9G4ht.cA; 2 pages.

Cho et al., A Traveler Information Service Structure in Hybrid T-DMB and Cellular Communication Network, Broadcast Systems Research Group, IEEE, 2006, pp. 747-750.

Christie et al., "Development and Deployment of GPS wireless devices for E911 and Location based services", IEEE 2002.

Chua et al., "Intelligent Portal for Event-triggered SMS Alerts", 2nd International Conference on Mobile Technology, Applications and Systems, 2005.

Civilis et al., "Efficient Tracking of Moving Objects with Precision Guarantees", IEEE, Proceedings of the First Annual International Conference on Mobile and Ubiquitous Systems: Networking and Services, 2004, 10 pages.

Dibdin, Peter, "Where are mobile location based services?", Dec. 14, 2001, pp. 1-8.

Dunn et al., "Wireless Emergency Call System", IBM TDB, Sep. 1994.

Ebine, "Dual Frequency resonant base station antennas for PDC systems in Japan", IEEE, pp. 564-567, 1999.

Evans, "In-Vehicle Man-Machine Interaction the Socrates Approach", Vehicle Navigation & Information System Conference Proceedings, 1994, Aug. 31-Sep. 2, 1994, pp. 473-477.

FM 3-25.26 Map Reading and Land Navigation Field Manual No. 3-25.26, Headquarters Department of the Army, Washington, DC [online] [retrieved on Apr. 9, 2004] [retrieved from http://155.217.58.58/cgi-bin/atdl.dll/fm/3-25.26/toc.htm] Jul. 20, 2001, pp. 1-7 and J-1 to J-3.

*GPS 12 Personal Navigator Owner's Manual & Reference*, Garmin Corporation, Jan. 1999, pp. 1-60.

Guo et al., "An Intelligent Query System based on Chinese Short Message Service for Restaurant Recommendation", IEEE 2007, 1 page.

Hameed et al., "An Intelligent Agent-Based Medication and Emergency System", IEEE 2006.

Helal et al., "Drishti: An Integrated Navigation System for Visually Impaired and Disabled", Fifth International Symposium on Wearable Computers (ISWC'01), IEEE, 2001, pp. 149-156.

Hohman et al., "GPS Roadside Integrated Precision Positioning System", Position Location and Navigation Symposium (IEEE 2000), pp. 221-230.

International Numbering and SMS—Type of Numbering, TON, Numbering Plan Indicator, NPI, [online] [Retrieved Jan. 5, 2007] Retrieved from the Internet <URL: http://www.activeexperts.com/support/activsms/tonnpi/.

Jirawimut et al., "A Method for Dead Reckoning Parameter Correction in Pedestrian Navigation System", IEEE Transactions on Instrumentation and Measurement, vol. 52, No. 1, Feb. 2003, pp. 209-215.

Ju et al., "RFID Data Collection and Integration based on Mobile Agent", IEEE, 2006.

Kbar et al., "Mobile Station Location based on Hybrid of Signal Strength and Time of Arrival", IEEE, 2005.

Koide et al., "3-D Human Navigation System with Consideration of Neighboring Space Information", IEEE International Conference on Systems, Man and Cybernetics, 2006 (SMC '06), vol. 2, (Oct. 8-11, 2006), pp. 1693-1698.

Lloyd et al., "Cellular phone base stations installation violate the Electromagnetic Compatibility regulations", IEEE, 2004.

Manabe et al., "On the M-CubITS Pedestrian Navigation System", IEEE, 2006, pp. 793-798.

Meier et al., "Location-Aware Event-Base Middleware: A Paradigm for Collaborative Mobile Applications?", Sep. 2003.

Miller et al., "Synchronization of Mobile XML Databases by Utilizing Deferred Views", IEEE 2004.

Nardi et al., "Integrating Communication and Information through Contact Map", Communications of the ACM, vol. 45, No. 4, Apr. 2002.

Northard, "Docking Station Communication Link", IBM TDB, Feb. 1994.

Oh et al., "Spatial Applications Using 4S Technology for Mobile Environment", IEEE 2002.

Paksoy et al., "The Global Position System-Navigation Tool of the Future", Journal of Electrical & Electronics, 2002, vol. 2, No. 1, pp. 467-476.

Parikh, "Tele Locate", IBM Technical Disclosure Bulletin, [online] [Retrieved Nov. 7, 2008] Retrieved from the Internet, URL: https://www.delphion.com/tdbs/tdb?order=92A+62775; Sep. 1992; 1 page.

Partial International Search Report, dated Jul. 29, 2008, issued in corresponding PCT/US2008/050295.

Pfoser et al., "Dynamic Travel Time Maps—Enabling Efficient Navigation", Proceedings of the 18th International Conference on Scientific and Statistical Database Management (SSDBM'06), IEEE, 10 pages.

Portfolio 2007; [online] [Retrieved on Jun. 14, 2007]; Retrieved from the Internet, URL: http://eric.wahlforss.com/folio; 3 pages.

RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.

Rekimoto, J., *Augment-able Reality: Situated Communication through Physical and Digital Spaces*, iswc, pp. 68, Second International Symposium on Wearable computers (ISWC'98), 1998, pp. 1-8.

Rogers et al., "Adaptive User Interfaces for Automotive Environments", IEEE Intelligent Vehicles Symposium 2000, Oct. 3-5, 2000, pp. 662-667.

Rozier, J., *Hear & There: An Augmented Reality System of Linked Audio*, Proceedings of the International Conference on Auditory Display, Atlanta, GA, Apr. 2000, pp. 1-6.

Samadani et al., "PathMaker: Systems for Capturing Trips", IEEE (2004) International Conference on Multimedia and Expo., Publication Date: Jun. 27-30, 2004, vol. 3, pp. 2123-2126, 2004.

Schreiner, "Where We At? Mobile Phones Bring GPS to the Masses", IEEE Computers Society, May/Jun. 2007, pp. 6-11.

Sung et al., "Towards Reliable Peer-to-Peer Data Sharing over Mobile Ad hoc Networks", IEEE, 2005.

Weib et al., "Zone services—An approach for location-based data collection", Proceedings of the 8th International Conference on E-commerce Technology and the 3rd IEEE International Conference on Enterprise Computing, E-Commerce and E-Services.

Yang et al., "A Mutlimedia System for Route Sharing and Video-based Navigation", IEEE, 2006, pp. 73-76.

Yanyan et al., "The model of optimum route selection in vehicle automatic navigation system based on unblocked reliability analyses", IEEE 2003.

Balliet, "Transportation Information Distribution System", IBM Technical Disclosure Bulletin, [online] [Retrieved Nov. 7, 2008] Retrieved from the Internet, URL: https://www.delphion.com/tdbs/tdb?order=86A+61395; Jun. 1986; 2 pages.

Charny, "AT&T puts 411 to the text"; [online] [Retrieved Mar. 4, 2009]; Retrieved from the Internet <URL http://news.cnet.com/ATT-puts-411-to-the-text/2100-1039_3-1000669.html; May 8, 2003; 2 pages.

Jain, R., Potential Networking Applications of Global Positioning Systems (GPS) [online] [retrieved on Nov. 18, 2008] [retrieved from http://arxiv.org/ftp/cs/papers/9809/9809079.pdf] OSU Technical Report TR-24, Apr. 1996, pp. 1-40.

International Search Report and Written Opinion, dated Jun. 9, 2008, issued in Interntiaonal Application No. PCT/US2007/088880, filed Dec. 27, 2007.

Spohrer. "New Paradigms for Using Computers", 1997; retrieved from the Internet, URL: <http://almaden.ibm.com/npuc97/1997/spohrer.htm>.

Yang et al. "Global Snapshots for Distributed Debugging", IEEE, pp. 436-440, 1992.

"Cyberguide: a mobile context-aware tour guide", Wireless Networks Archive (Special Issue: Mobile computing and networking; selecting papers from MobiCom '96), 3(5):421-433, 1997.

"Frontiers in electronic media", Interactions Archive 4(4):32-64, 1997.

"Location-aware mobile applications based on directory services", International Conference on Mobile Computing and Networking Archive, Proceedings on the 3rd Annual ACM/IEEE International Conference on Mobile Computing and Networking, Budapest, Hungary, pp. 23-33, 1997.

Sharpe et al., U.S. Appl. No. 12/434,586, filed May 1, 2009.

Sharp et al., U.S. Appl. No. 12/434,582, filed May 1, 2009.

Van Os et al., U.S. Appl. No. 12/165,413, filed Jun. 30, 2008.

Blumenberg et al., U.S. Appl. No. 12/119,316, filed May 12, 2008.

Low et al., U.S. Appl. No. 12/233,358, filed Sep. 18, 2008.

Sazegari et al., U.S. Appl. No. 12/122,339, filed May 16, 2008.

Johnson, U.S. Appl. No. 12/044,363, filed Mar. 7, 2008.

Johnson, U.S. Appl. No. 11/827,065, filed Jul. 10, 2007.

Herz, U.S. Appl. No. 12/270,814, filed Nov. 13, 2008.

Budka et al., "A Bayesian method to Improve Mobile Geolocation Accuracy", IEEE, 2002, pp. 1021-1025.

Yamamoto et al., "Position Location Technologies Using Signal Strength in Cellular Systems", IEEE, 2001, pp. 2570-2575.

International Search Report and Written Opinion, dated Oct. 1, 2009, issued in PCT/US2009/041298.

Drane et al., "The accurate location of mobile telephones", Third Annual World Congress on Intelligent Transport Systems, Orlando, Florida, Oct. 1996.

"Travel Time Data Collection Handbook—Chapter 5: Its Probe Vehicle Techniques", FHWA-PL-98-035 Report, Department of Transport, University of Texas, Mar. 1998; [online] Retrieved from the Internet at http://www.fhwa.dot.gov/ohim/handbook/chap5.pdf.

Ygnace et al., "Travel Time Estimation on the San Francisco Bay Area Network Using Cellular Phones as Probes", Working Paper, Institute of Transportation Studies, University of California, Berkeley, 2000.

Wang et al., "A Unified Vehicle Supervising and Traffic Information System", IEEE, 1996, pp. 968-972.

Weiss et al., "Zone services—An approach for location-based data collection", Proceedings of the 8th International Conference on E-commerce Technology and the 3rd IEEE International Conference on Enterprise Computing, E-Commerce and E-Services, 2006; 8 pages.

* cited by examiner

MOBILE DEVICE BASE STATION

RELATED APPLICATION

This application claims priority to U.S. Provisional Patent Application Ser. No. 60/946,788 filed Jun. 28, 2007, entitled "Mobile Device Base Station," the contents of which are incorporated herein by reference.

TECHNICAL FIELD

The subject matter of this patent application is generally related to mobile devices.

BACKGROUND

Mobile devices equipped with wireless transceivers can connect to a network when in proximity of an access point to the network, commonly referred to as a base station. The area surrounding a base station where the signal strength is sufficient for access is commonly referred to as a "hotspot." Hotspots can range from a single room to many square miles of overlapping hotspots. Connectivity to a network through a hotspot can intermittently fail or drop when traveling between hotspots. In some locations there may be no hotspots available. In such locations, the only access to the Internet may be through a cellular phone network.

To enable subscribers to access the Internet, some carriers provide their subscribers with a portable wireless transceiver card (e.g., a PCI card) that plugs-in to a notebook computer and provides access to hotspots (e.g., Wi-Fi, WiMax) and cellular phone networks. Such a card, however, only provides network connectivity to the mobile device hosting the card. Other users in the same location who have mobile devices that can only access, for example, a Wi-Fi network, will be denied access to the cellular network. Moreover, the card will use up a slot in the mobile device I/O that the user might rather keep free for another device (e.g., a memory module). Finally, having a separate card means another piece of equipment that can get lost, damaged or stolen.

SUMMARY

A mobile device can be configured as a base station to be used by other mobile devices and non-mobile devices to gain access to network services. The mobile device can be configured to provide and manage secure access to variety of networks (e.g., Wi-Fi, WiMax, Internet, cellular) and network services (e.g., map services, web services, syncing services).

In some implementations, a mobile device includes a processor and a storage device coupled to the processor. The storage device includes instructions, which, when executed by the processor, causes the processor to configure the mobile device to be an access point for a wireless network. A communication interface is coupled to the processor and operable for receiving an access request from a requesting device, and for coupling the requesting device to the wireless network in response to the access request.

In some implementations, a method includes: configuring a mobile device to be an access point for a wireless network; receiving an access request from a requesting device; and coupling the requesting device to the wireless network in response to the access request.

DETAILED DESCRIPTION

Figure 1:
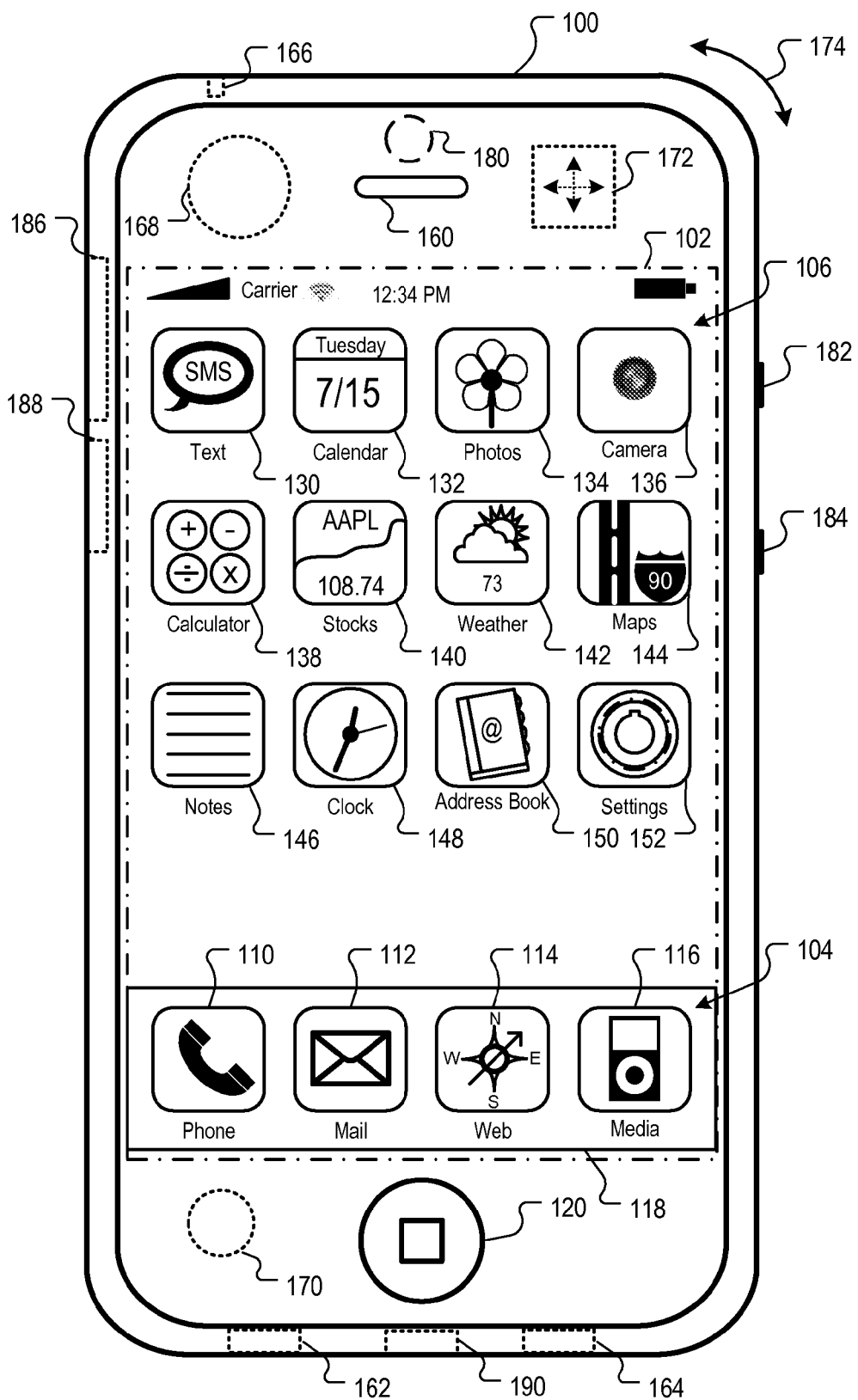
FIG. 1 is a block diagram of an example mobile device.

FIG. 1 is a block diagram of an example mobile device 100. The mobile device 100 can, for example, be implemented in a handheld computer, a personal digital assistant, a cellular telephone, a network appliance, a camera, a smart phone, an enhanced general packet radio service (EGPRS) mobile phone, a network base station, or other electronic device, or a combination of any two or more of these data processing devices or other data processing devices.

Mobile Device Overview

In some implementations, the mobile device 100 includes a touch-sensitive display 102. The touch-sensitive display 102 can implement a liquid crystal display (LCD) technology, a light emitting polymer display (LPD) technology, or some other display technology. The touch-sensitive display 102 can be sensitive to haptic and/or tactile contact with a user.

In some implementations, touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846; 6,570,577; 6,677,932; and U.S. Patent Publication 2002/0015024A1, each of which is incorporated by reference herein in its entirety.

In some implementations, the mobile device 100 includes one or more graphical user interfaces displayed on the touch-sensitive display 102 for providing the user access to the various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a function menu bar 118. In some implementations, each of the device functionalities can be accessed from a top-level graphical user interface, such as the graphical user interface illustrated in FIG. 1. Touching the touch-sensitive display 102 on one of the objects 110, 112, 114 or 116 can, for example, invoke the corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., via Wi-Fi) to other wireless devices in the vicinity. For example, mobile device 100 can be configured as a base station for one or more devices. As such, mobile device 100 can grant or deny network access to other wireless devices. Other networking schemes and configurations are possible. Exemplary networking schemes and configurations are discussed in FIGS. 4 and 5 below.

In some implementations, upon invocation of particular device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have a corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 134, 136, 138, 140, 142, 144, 146, 148, 150 and 152 can invoke a corresponding object environment and functionality. The top-level graphical user interface environment of FIG. 1 can be restored by pressing the button 120.

Additional and/or different display objects can also be displayed in the graphical user interface of FIG. 1. For example, if the device 100 is functioning as a base station for other devices, one or more "connection" icons may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as a 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, a personal computer, a printer, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used, as described in co-pending U.S. Provisional Patent Application No. 60/945,904, for "Multiplexed Data Stream Protocol," filed Jun. 22, 2007, which patent application is incorporated by reference herein in its entirety.

Figure 2:
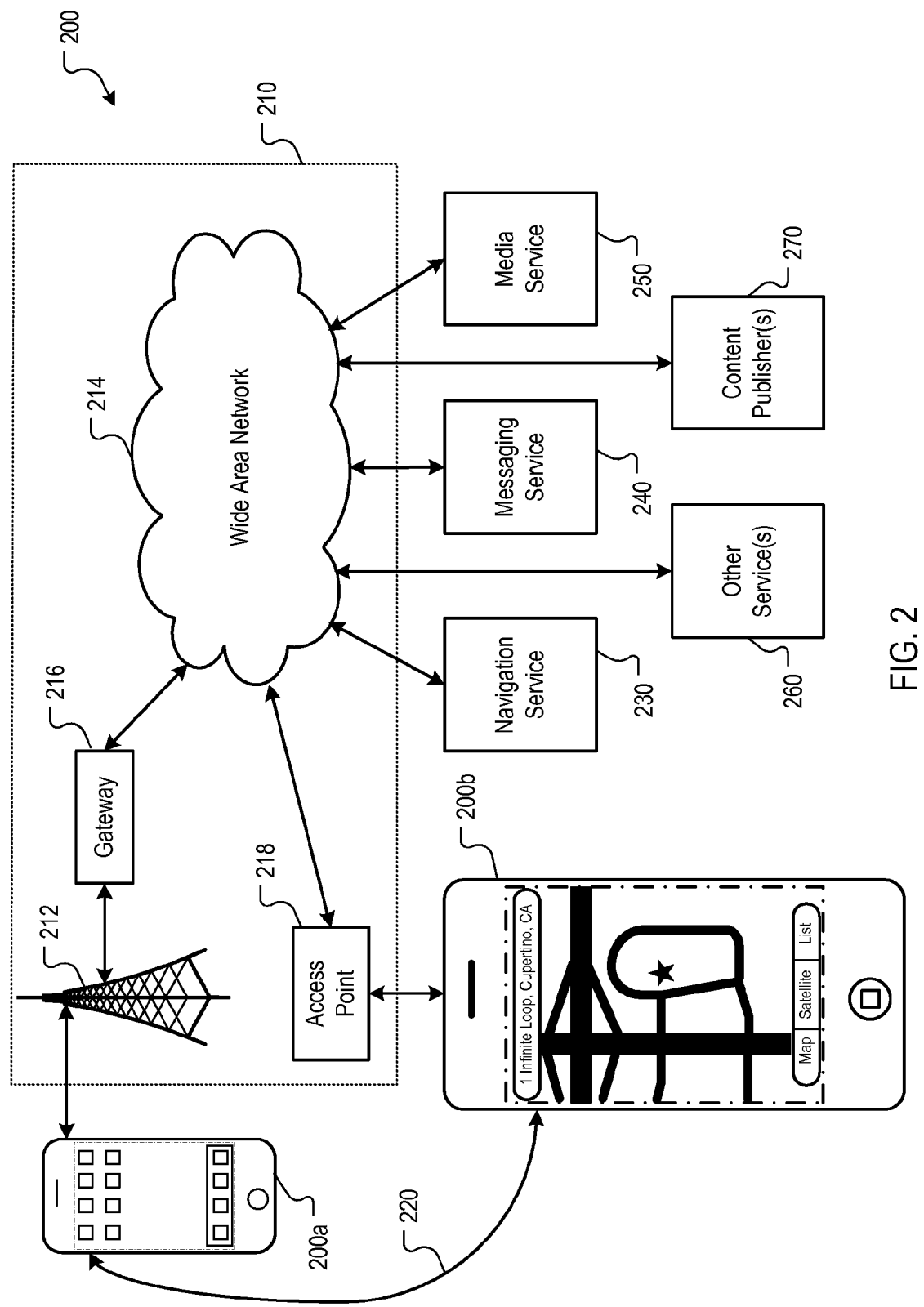
FIG. 2 is a block diagram of an example network operating environment for the mobile device of FIG. 1.

FIG. 2 is a block diagram of an example network operating environment 200 for the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point 218, such as an 802.11g wireless access point, can provide communication access to the wide area network 214. In some implementations, both voice and data communications can be established over the wireless network 212 and the access point 218. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., TCP/IP or UDP protocols). Likewise, the mobile device 100b can place and receive phone calls, send and receive e-mail messages, and retrieve electronic documents over the access point 218 and the wide area network 214. In some implementations, the mobile device 100 can be physically connected to the access point 218 using one or more cables and the access point 218 can be a personal computer. In this configuration, the mobile device 100 can be referred to as a "tethered" device.

In some implementations, the mobile devices 100a and 100b can also establish communications by other means. For example, the wireless device 100a can communicate with other wireless devices, e.g., other wireless devices 100, cell phones, etc., over the wireless network 212. Likewise, the mobile devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250 and 260 and/or one or more content publishers 270 over the one or more wired and/or wireless networks 210. For example, a navigation service 230 can provide navigation information, e.g., map information, location information, route information, and other information, to the mobile device 100. In the example shown, a user of the mobile device 100b has invoked a map functionality, e.g., by touching the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. One or more other services 260 can also be utilized by the mobile device 100. For example, a syncing service can, for example, perform syncing services (e.g., sync files). An activation service can, for example, perform an activation process for activating the mobile device 100, as described in U.S. patent application Ser. No. 11/767,447, for "Device Activation and Access", filed Jun. 22, 2007, which patent application is incorporated by reference herein in its entirety. Other services can also be provided, including a software update service that automatically determines whether software updates exist for software on the mobile device 100, downloads the software updates to the mobile device 100 where the updates can be manually or automatically unpacked and/or installed.

The mobile device 100 can also access other data and content over the one or more wired and/or wireless networks 210. For example, content publishers 270, such as news sites, RSS feeds, web sites, blogs, social networking sites, developer networks, etc., can be accessed by the mobile device 100, e.g., by invocation of a web browsing function or application (e.g., a browser) in response to a user touching the Web object 114.

Example Device Architecture

Figure 3:
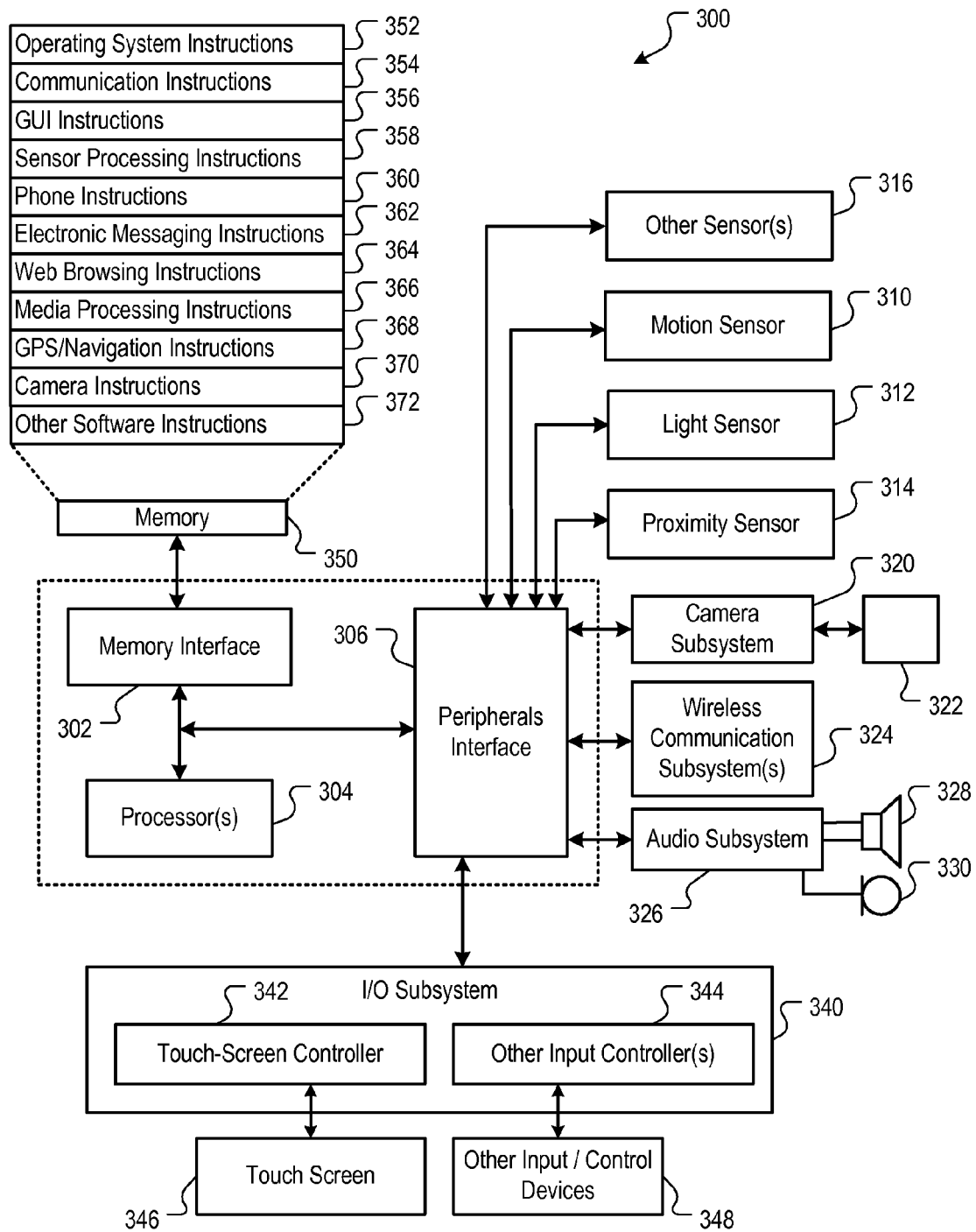
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302 one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system (e.g., a GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through a communication interface including one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., a UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other related processes and functions.

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Mobile Device Operating as a Wireless Base Station

Figure 4:
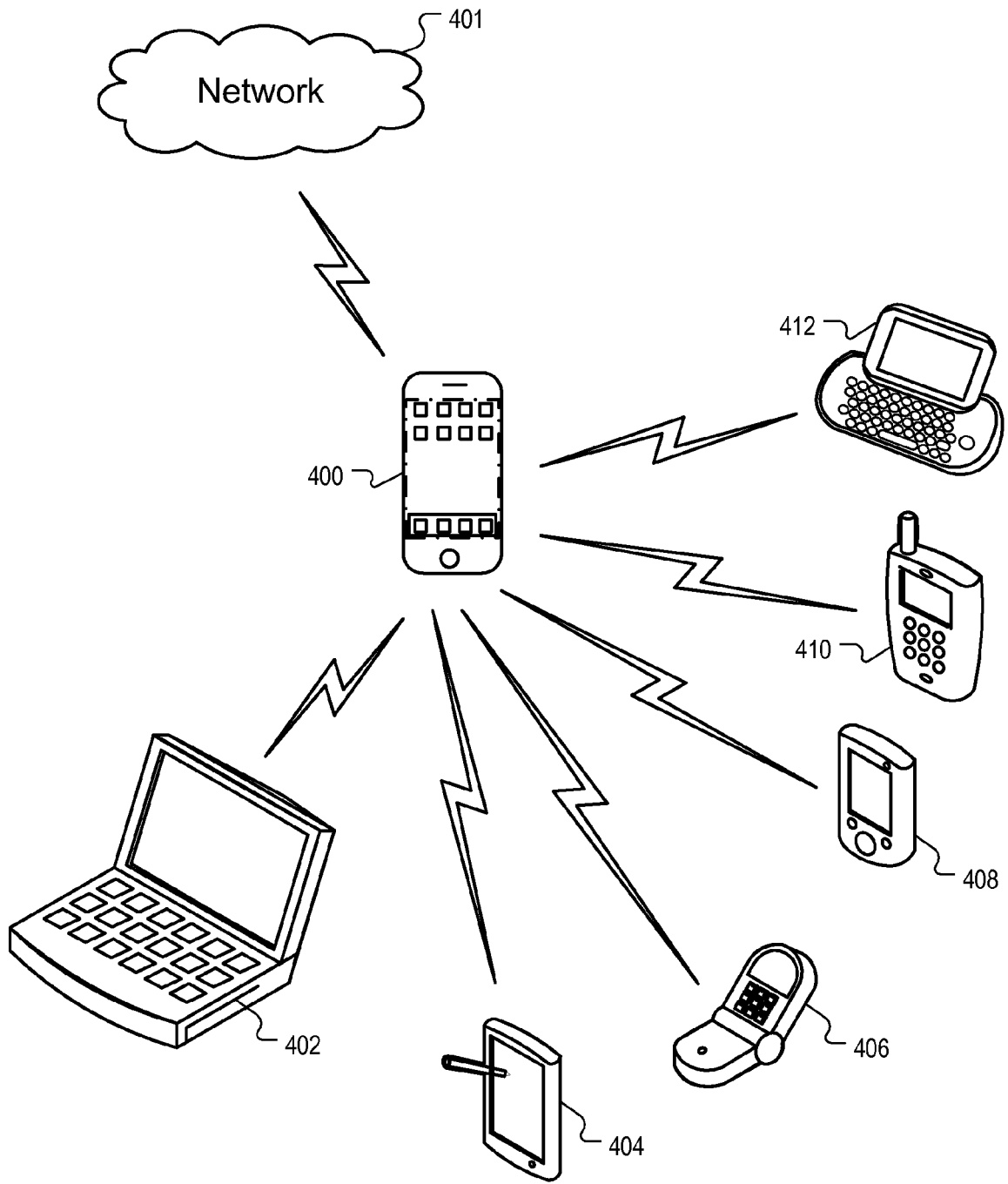
FIG. 4 illustrates an example of using the mobile device of FIG. 1 as a wireless base station.

FIG. 4 illustrates an example of using the mobile device 100 as a wireless access point, such as a Wi-Fi or WiMax base station and/or a cellular access point. In the example shown, a user can configure the mobile device 100 to be a portion of a wireless distribution system for various wireless devices or clients, such as laptops, other phones, PDAs, etc. For example, the mobile device 100 can be configured as a wireless base station for providing network connectivity or Internet access. As such, mobile device 100 can extend network 401 connectivity to other wireless devices. In some implementations, the mobile device 100 can provide a stand-alone unit deployed as an access point for Internet connectivity. In particular, the connectivity can also be used for services such as VoIP phone access, gaming, and basic connectivity of consumer electronics such as televisions, DVD players, and digital cameras.

In operation, the mobile device 100 may bridge wireless devices to the network 401. In particular, the bridge connection may provide Wi-Fi (e.g., Internet) access from the network 401 to the wireless devices. For example, the mobile device 100 can be configured to distribute wireless access to one or more wireless devices, including, but not limited to, a laptop device 402, a tablet computer 404, a cellular phone 406, a PDA 408, a smart phone 410, an enhanced general packet radio service (EGPRS) mobile phone 412, or other wireless capable devices.

The network 401 may be the Internet, VoIP network, or any other communication system or systems at one or more locations capable of permitting a wireless link. Such an example wireless link may be via 802.11a, 802.11b, 802.11g, 802.11n, 802.20, Bluetooth®, WiMAX®, and many others. While illustrated as a single or continuous network, network 401 may be logically divided into various sub-nets or virtual networks without departing from the scope of this disclosure, so long as at least portion of network 401 may facilitate communications between mobile device 100 and at least one wireless device 402-412. In some implementations, the network 401 may include wireless local area networks (WLAN), Bluetooth® networks, one or more radio access networks (RANs), metropolitan area networks (MANs), wide area networks (WANs), mobile ad-hoc networks (MANets), mobile phone network (e.g., a mobile phone network using any combination of GSM, CDMA, GPRS, EDGE, EV-DO, WCDMA, UMTS, and HSDPA technologies), or other proprietary wireless protocols.

In some implementations, the mobile device 100 can be configured as an Airport or Airport Extreme type of network (available from Apple, Inc. of Cupertino, Calif.). In this example, mobile device 100 may utilize one or more Airport technology systems to provide Wi-Fi access to other wireless devices (e.g., using protocols such as 802.11b, 802.11g, and 802.11n, etc.). In some implementations, the Airport networking system may provide wireless security, such as wired equivalent privacy (WEP) with encryption, to the mobile device 100 and other connected wireless devices. Advantageously, the devices connected by mobile device 100 (configured with Airport or Airport Extreme networking) can share an Internet connection, exchange files, access local and remote file servers, interact with other users in multiplayer games, or share a printer, to name a few examples.

In some implementations, the mobile device 100 may provide an ad hoc network, where wireless devices manage themselves without access points. For example, the mobile device 100 can be configured to employ a mobile ad hoc network (MANet). The MANet can include a network of nodes (e.g., computers, phones, and other wireless devices) that are near each other, but have no fixed infrastructure. The mobile device 100 may create a MANet by self-configuring a network of mobile routers (and associated hosts) connected by wireless links. Upon configuration, the network of mobile routers may form an arbitrary topology. Such a network may operate in a standalone fashion where the mobile device 100 is the base station and other wireless devices connect through the mobile device 100 over the MANet.

In some implementations, the mobile device 100 may be used to employ a vehicular ad hoc network (VANet). VANets may generally operate as a MANet used for communication among vehicles and between vehicles and roadside equipment.

In some implementations, the mobile device 100 can function as an extension of an existing Wi-Fi network. In some implementations, the mobile device 100 can function as an extension of a wired internet service connection. For example, the mobile device 100 can be a wireless router that enables wireless connectivity in a home or business setting.

In some implementations, the mobile device 100 includes a native function, for example as a mobile phone, which is configured to include a wireless access point.

Configuring a Mobile Device for Base Station Operation

Figure 5:
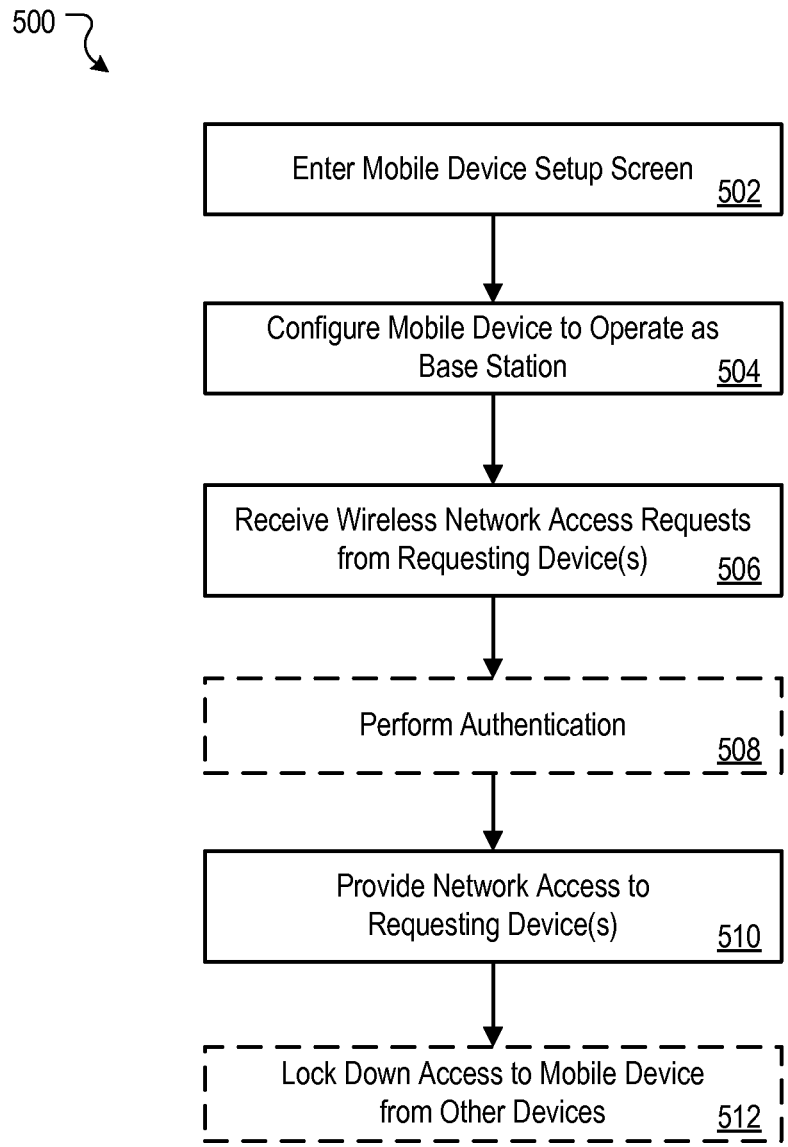
FIG. 5 illustrates an example process for providing wireless base station functionality from a mobile device.

FIG. 5 illustrates an example process 500 for providing wireless base station functionality using a mobile device. In some implementations, the method 500 can be used with configuration 200, as described in reference to FIG. 2. Generally, the process 500 includes configuration, authentication, and an optional lock down process.

The process 500 begins when a mobile user (device 100) selects the settings object 152 to enter a mobile device setup screen (502). Alternatively, the mobile device setup screen can be invoked automatically by an authorized external device, such as a laptop or other wireless device. For example, a mobile device user may preconfigure a connection between a selected device (e.g., the user's laptop) and device 100. As such, the mobile device 100 may recognize the device and automatically enable a base station configuration.

In the event that the mobile device/base station has not been preconfigured, the user can employ the setup screen. Accordingly, the setup screen can be used for configuring the mobile device 100 to operate as a base station (504). For example, the user may use the setup screen to set up user accounts, access point information, security protocols, network rules, and other connection details. In some implementations, the configuration can include multiple network access set-up as well as client device set-up. In some implementations, the user is presented with a set-up dialog for providing input specifying a desired base station configuration. When the input is received, a configuration service on device 100 can install the specified configuration information to the device 100.

In some implementations, the configuration can also include selecting a "home" setting or an "away" setting. The settings can be used to indicate whether the device is being used as a Wi-Fi base station at home or in another location. For example, the device 100 can be configured differently for home usage than for travel usage.

In some implementations, the device 100 can perform a search for available networks. For example, the user may select a search object in the setup screen to search for some or all available networks. The available networks may be displayed for selection. As such, the user may select and/or connect to one or more of the displayed networks.

In general, when a new device is recognized, the mobile device can extract communication information about protocols and external network addresses, for example. In some implementations, the network details can then be configured automatically based on the information extracted. In some implementations, manual network set-up procedures may be performed using wired or wireless means.

In some implementations, the configuration may include searching for other devices in the vicinity of the mobile device 100. If other devices are discovered, the mobile device 100 may automatically bind these devices to a particular network. For example, the mobile device 100 may automatically bind an in-range laptop device to one or more networks hosted on the device 100, such as network 401.

In some implementations, the device 100 may receive network access requests from external wireless devices (506). For example, a PDA user may request Internet access from device 100 to download driving directions. In operation, the mobile device 100 (configured as a wireless base station) can accept connection requests from wireless devices and determine whether a particular wireless device can gain access to the network 401. The connection requests may be examined by the mobile device 100. For example, the mobile device 100 can optionally perform authentication tasks for wireless users before allowing them on the wireless network (508).

The optional authentication tasks can be performed using access protocols such as WEP, Wi-Fi Protected Access (WPA), WPA2, and others. The authentication may include accessing a requester's (e.g., wireless user's) credentials, validating the credentials, and accepting or rejecting the user based on those credentials. In some implementations, a message may be sent to the user allowing or disallowing the user's device access to the wireless network. In some implementations, the connection may occur automatically upon acceptance of a particular user's credentials.

In some implementations, the optional authentication process can make use of one or more standard passwords to gain access to the wireless network using device 100. In other implementations, the wireless device 100 may operate in a shared mode. The shared mode can allow users to share a common password or "key." For example, when using WPA for accessing the device 100, a "pre-shared key" (PSK) can be used to authenticate and grant access to requesting users. Other methods are possible.

Upon examination of access requests, mobile device 100 can determine whether network access is granted to one or more requesting devices. If access is denied for one or more devices, the device 100 can send a message to the requesting device indicating access has been denied. In some implementations, further information can be provided. In other implementations, the denial may occur, but messages may not be sent to the requesting device.

If device 100 determines access can be granted to any or all requesting devices, access to the wireless network 401 can be provided (510). The device 100 can automatically present information in a requesting device's screen before, during, and after network initialization. For example, a message may be presented to a requesting device user including help, update information, instructions, specific advertising, or other relevant information. In some implementations, the device 100 may present further information to a requesting device user. For example, device 100 may present a particular web address or other network resource upon network initialization and/or connection. In another example, the device 100 may direct a client processing system on a network to a particular volume on a file server upon network initialization.

As discussed above in FIG. 3, upon connecting to the wireless device 100 (i.e., the network), graphical representations (e.g., icons) can be presented within device 100 that indicate other devices are connected to the device. In some implementations, networking display objects indicating a signal strength can be presented in the wireless devices connected to device 100.

In some implementations, providing access to a wireless device can include setting up and tearing down a secure communication session (e.g., SSL session) for the requesting device, as described in U.S. patent application Ser. No. 11/767, 447, "Device Activation and Access," filed Jun. 22, 2007. In this implementation, the mobile device 100 can setup a secure communication session with the requesting device and with the wireless network for which access has been requested.

After granting network access to one or more wireless devices, device 100 may be configured to automatically refuse further access to other devices (e.g., a "lockdown") (512). A lockdown can include any method by which access to a particular network resource is denied or locked based upon authentication of a user, a device, or other policy or rule compliancy.

In general, a user can configure a lockdown to occur for various reasons, including but not limited to various trigger events. For example, a user can configure a lockdown to occur after a particular number of users connect (e.g., to save network throughput or bandwidth). As another example, a lockdown can refer to a locking of one or more portions of the network, such that the lockdown protects sensitive information, such as banking records or passwords on the device 100. Accordingly, the lockdown may be placed on specific files and/or network available documents, but still enable other devices to connect to the Wi-Fi connection through device 100.

In some implementations, a user can configure a lockdown to protect the network from intruders and to prevent exposure, fraud or abuse. For example, device 100 can be configured to lock down when an external device accesses the network without permission. In this case, further network access to the offending device and other requesting devices may be denied until a user of device 100 unlocks the network access. Other lockdown scenarios are possible.

In some implementations, a user can configure a lockdown to occur based on the current geographic location of the mobile device 100, or proximity of the device 100 to particular locations (e.g., competing businesses). For example, the user could specify that the device cannot be used for network access while the mobile device 100 is located in a particular country.

In some implementations, a user can configure a lockdown to occur based on time or distance. For example, the device 100 can lock down at certain times of day (e.g., after 6:00 PM) or on certain days (e.g., weekends). The device 100 can also lockdown when within a specified distance (e.g., radius) of specified geographic locations or other networks (e.g., other Wi-Fi networks).

In some implementations, network access through the device 100 is allowed for certain specified (e.g., user-specified) machine addresses or other unique identifiers (e.g., a MAC address). For example, a user may only want to allow network access to their notebook computer, instead of, or in addition to, requesting passwords, keys or other security information.

In some implementations, all remote access requests are received by security process, which sets up and tears down a secure communication sessions (e.g., Secure Socket Layer (SSL). An example of such a process is described in U.S. patent application Ser. No. 11/767,447, for "Device Activation and Access," filed Jun. 22, 2007.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A mobile device comprising:
   a processor;
   a storage device coupled to the processor and having instructions stored thereon, which, when executed by the processor, causes the processor to configure the mobile device to be an access point for a wireless network; and a communication interface coupled to the processor and operable for receiving an access request from a first requesting device, and for coupling the first requesting device to the wireless network in response to the access request;

where the instructions, when executed by the processor, are further operable to cause the processor to lock down the mobile device to prevent access to the wireless network by a second requesting device based on a number of devices currently coupled to the wireless network through the mobile device, based on a location of the mobile device, or based on a time of the access request.

2. The mobile device of claim 1, where the mobile device includes a multi-touch-sensitive display.

3. The mobile device of claim 1, where the mobile device includes a telephony application.

4. The mobile device of claim 1, where the wireless network is a cellular network.

5. The mobile device of claim 1, where the processor is operable to authenticate the requesting device.

6. The mobile device of claim 5, where the requesting device is authenticated using one from the group of wireless security protocols consisting of: wired equivalent privacy (WEP), Wi-Fi Protected Access (WPA) or WPA2.

7. The mobile device of claim 1, where the processor is operable to set up a secure communication session for the requesting device.

8. The mobile device of claim 1, where the wireless network is from a group of wireless networks consisting of wireless local area networks (WLAN), Bluetooth® networks, radio access networks (RANs), metropolitan area networks (MANs), wide area networks (WANs), mobile ad-hoc networks (MANets) or mobile phone networks.

9. The mobile device of claim 1, where the processor is operable to search for available wireless networks in a vicinity of the mobile device.

10. The mobile device of claim 1, where the mobile device can be configured as a base station at home or in another location, where the mobile device can be configured in a first user-settable configuration with one or more first network settings at home and configured in a second user-settable configuration with one or more second network settings in another location, and where the first and second user-settable configurations can be simultaneously stored in the storage device.

11. The mobile device of claim 1, where the mobile device includes a first native function as a phone and where the mobile device is further configured to be an access point.

12. The mobile device of claim 1, wherein the mobile device is locked down based on the number of devices currently coupled to the wireless network through the mobile device.

13. The mobile device of claim 1, wherein the mobile device is locked down based on the location of the mobile device.

14. The mobile device of claim 1, wherein the mobile device is locked down based on the time of the access request.

15. A method comprising:
configuring a mobile device to be an access point for a wireless network;
receiving, at the mobile device, an access request from a first requesting device;
coupling, by the mobile device, the first requesting device to the wireless network in response to the access request; and
locking down the mobile device to prevent access to the wireless network by a second requesting device based on a number of devices currently coupled to the wireless network through the mobile device, based on a location of the mobile device, or based on a time of the access request.

16. The method of claim 15, further comprising:
authenticating the requesting device.

17. The method of claim 15, further comprising:
setting up a secure communication session for the requesting device.

18. The method of claim 15, where configuring further comprises:
searching for the wireless network in a vicinity of the mobile device; and if a network is available,
configuring the mobile device to be an access point for the wireless network.

19. The method of claim 15, where configuring the mobile device further comprises:
configuring the mobile device as a base station at home or in another location, where the mobile device can be configured in a first user-settable configuration with one or more first network settings at home and configured in a second user-settable configuration with one or more second network settings in another location, and where the first and second user-settable configurations can be simultaneously stored in the storage device.

* * * * *

(12) EX PARTE REEXAMINATION CERTIFICATE (10561st)

United States Patent
Forstall et al.

(10) Number: US 8,463,238 C1
(45) Certificate Issued: Apr. 3, 2015

(54) MOBILE DEVICE BASE STATION

(75) Inventors: Scott Forstall, Mountain View, CA (US); Gregory N. Christie, San Jose, CA (US); Robert E. Borchers, Pleasanton, CA (US); Kevin Tiene, Cupertino, CA (US)

(73) Assignee: Apple Inc., Cupertino, CA (US)

Reexamination Request:
No. 90/013,076, Dec. 4, 2013

Reexamination Certificate for:
Patent No.: 8,463,238
Issued: Jun. 11, 2013
Appl. No.: 11/968,609
Filed: Jan. 2, 2008

Related U.S. Application Data

(60) Provisional application No. 60/946,788, filed on Jun. 28, 2007.

(51) Int. Cl.
| | |
|---|---|
| H04M 1/66 | (2006.01) |
| H04W 88/08 | (2009.01) |
| H04W 88/02 | (2009.01) |
| H04M 1/725 | (2006.01) |
| H04W 8/24 | (2009.01) |

(52) U.S. Cl.
CPC .............. *H04W 88/08* (2013.01); *H04W 88/02* (2013.01); *H04M 1/7253* (2013.01); *H04W 8/245* (2013.01); *H04M 2250/22* (2013.01); *H04M 1/72502* (2013.01)
USPC .......... 455/411; 370/338; 455/41.2; 455/418; 455/426.1; 455/456.4; 455/557

(58) Field of Classification Search
None
See application file for complete search history.

(56) References Cited

To view the complete listing of prior art documents cited during the proceeding for Reexamination Control Number 90/013,076, please refer to the USPTO's public Patent Application Information Retrieval (PAIR) system under the Display References tab.

*Primary Examiner* — Ovidio Escalante

(57) ABSTRACT

A mobile device can be configured as a base station to be used by other mobile devices and non-mobile devices to gain access to network services. The mobile device can be configured to provide and manage secure access to variety of networks (e.g., Wi-Fi, WiMax, Internet, cellular) and network services (e.g., map services, web services, syncing services).

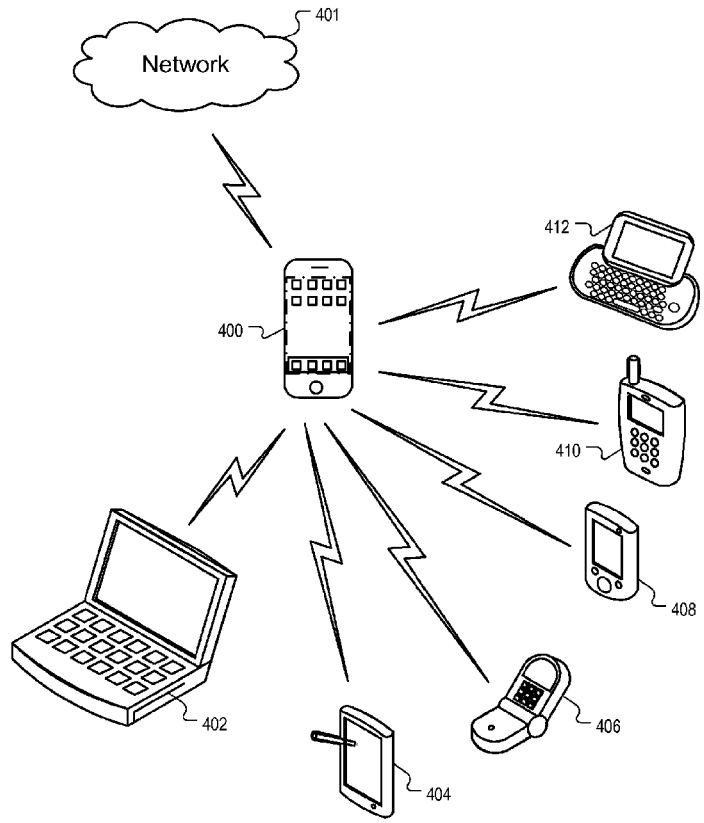

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 12-14 are cancelled.

Claims 1 and 15 are determined to be patentable as amended.

Claims 2-11 and 16-19, dependent on an amended claim, are determined to be patentable.

New claims 20-59 are added and determined to be patentable.

1. A mobile device comprising:
   a processor;
   a storage device coupled to the processor and having instructions stored thereon, which, when executed by the processor, [causes] *cause* the processor to configure the mobile device to be an access point for a wireless network; and
   a communication interface coupled to the processor and operable for receiving an access request from a first requesting device, and for coupling the first requesting device to the wireless network in response to the access request;
   where the instructions, when executed by the processor, are further operable to cause the processor to lock down the mobile device to prevent access to the wireless network by [a second] *another* requesting device [based on] *when a number of devices currently coupled to the wireless network through the mobile device*[, based on a location of the mobile device, or based on a time of the access request] *equals a predetermined number of devices.*

15. A method comprising:
    configuring a mobile device to be an access point for a wireless network;
    receiving, at the mobile device, an access request from a first requesting device;
    coupling, by the mobile device, the first requesting device to the wireless network in response to the access request; and
    locking down the mobile device to prevent access to the wireless network by [a second] *another* requesting device [based on] *when a number of devices currently coupled to the wireless network through the mobile device*[, based on a location of the mobile device, or based on a time of the access request] *equals a predetermined number of devices.*

20. *A mobile device comprising:*
    *a processor;*
    *a storage device coupled to the processor and having instructions stored thereon, which, when executed by the processor, cause the processor to configure the mobile device to be an access point for a wireless network; and*
    *a communication interface coupled to the processor and operable for receiving an access request from a first requesting device, and for coupling the first requesting device to the wireless network in response to the access request;*
    *where the instructions, when executed by the processor, are further operable to cause the processor to lock down the mobile device to prevent access to the wireless network by another requesting device based on a location of the mobile device.*

21. *The mobile device of claim 20, where the mobile device includes a multi-touch-sensitive display.*

22. *The mobile device of claim 20, where the mobile device includes a telephony application.*

23. *The mobile device of claim 20, where the wireless network is a cellular network.*

24. *The mobile device of claim 20, where the processor is operable to authenticate the requesting device.*

25. *The mobile device of claim 24, where the requesting device is authenticated using one from the group of wireless security protocols consisting of: wired equivalent privacy (WEP), Wi-Fi Protected Access (WPA) or WPA2.*

26. *The mobile device of claim 20, where the processor is operable to set up a secure communication session for the requesting device.*

27. *The mobile device of claim 20, where the wireless network is from a group of wireless networks consisting of wireless local area networks (WLAN), Bluetooth® networks, radio access networks (RANs), metropolitan area networks (MANs), wide area networks (WANs), mobile ad-hoc networks (MANets) or mobile phone networks.*

28. *The mobile device of claim 20, where the processor is operable to search for available wireless networks in a vicinity of the mobile device.*

29. *The mobile device of claim 20, where the mobile device can be configured as a base station at home or in another location, where the mobile device can be configured in a first user-settable configuration with one or more first network settings at home and configured in a second user-settable configuration with one or more second network settings in another location, and where the first and second user-settable configurations can be simultaneously stored in the storage device.*

30. *The mobile device of claim 20, where the mobile device includes a first native function as a phone and where the mobile device is further configured to be an access point.*

31. *A method comprising:*
    *configuring a mobile device to be an access point for a wireless network;*
    *receiving, at the mobile device, an access request from a first requesting device;*
    *coupling, by the mobile device, the first requesting device to the wireless network in response to the access request; and*
    *locking down the mobile device to prevent access to the wireless network by another requesting device based on a location of the mobile device.*

32. *The method of claim 31, further comprising:*
    *authenticating the requesting device.*

33. *The method of claim 31, further comprising:*
    *setting up a secure communication session for the requesting device.*

34. *The method of claim 31, where configuring further comprises:*
    *searching for the wireless network in a vicinity of the mobile device; and if a network is available,*
    *configuring the mobile device to be an access point for the wireless network.*

35. The method of claim 31, where configuring the mobile device further comprises:
configuring the mobile device as a base station at home or in another location, where the mobile device can be configured in a first user-settable configuration with one or more first network settings at home and configured in a second user-settable configuration with one or more second network settings in another location, and where the first and second user-settable configurations can be simultaneously stored in the storage device.

36. A mobile device comprising:
a processor;
a storage device coupled to the processor and having instructions stored thereon, which, when executed by the processor, cause the processor to configure the mobile device to be an access point for a wireless network; and
a communication interface coupled to the processor and operable for receiving an access request from a first requesting device, and for coupling the first requesting device to the wireless network in response to the access request;
where the instructions, when executed by the processor, are further operable to cause the processor to lock down the mobile device to prevent access to the wireless network by another requesting device based on a time of the access request.

37. The mobile device of claim 36, where the mobile device includes a multi-touch-sensitive display.

38. The mobile device of claim 36, where the mobile device includes a telephony application.

39. The mobile device of claim 36, where the wireless network is a cellular network.

40. The mobile device of claim 36, where the processor is operable to authenticate the requesting device.

41. The mobile device of claim 40, where the requesting device is authenticated using one from the group of wireless security protocols consisting of: wired equivalent privacy (WEP), Wi-Fi Protected Access (WPA) or WPA2.

42. The mobile device of claim 36, where the processor is operable to set up a secure communication session for the requesting device.

43. The mobile device of claim 36, where the wireless network is from a group of wireless networks consisting of wireless local area networks (WLAN), Bluetooth® networks, radio access networks (RANs), metropolitan area networks (MANs), wide area networks (WANs), mobile ad-hoc networks (MANets) or mobile phone networks.

44. The mobile device of claim 36, where the processor is operable to search for available wireless networks in a vicinity of the mobile device.

45. The mobile device of claim 36, where the mobile device can be configured as a base station at home or in another location, where the mobile device can be configured in a first user-settable configuration with one or more first network settings at home and configured in a second user-settable configuration with one or more second network settings in another location, and where the first and second user-settable configurations can be simultaneously stored in the storage device.

46. The mobile device of claim 36, where the mobile device includes a first native function as a phone and where the mobile device is further configured to be an access point.

47. A method comprising:
configuring a mobile device to be an access point for a wireless network;
receiving, at the mobile device, an access request from a first requesting device;
coupling, by the mobile device, the first requesting device to the wireless network in response to the access request; and
locking down the mobile device to prevent access to the wireless network by another requesting device based on a time of the access request.

48. The method of claim 47, further comprising:
authenticating the requesting device.

49. The method of claim 47, further comprising:
setting up a secure communication session for the requesting device.

50. The method of claim 47, where configuring further comprises:
searching for the wireless network in a vicinity of the mobile device; and if a network is available,
configuring the mobile device to be an access point for the wireless network.

51. The method of claim 47, where configuring the mobile device further comprises:
configuring the mobile device as a base station at home or in another location, where the mobile device can be configured in a first user-settable configuration with one or more first network settings at home and configured in a second user-settable configuration with one or more second network settings in another location, and where the first and second user-settable configurations can be simultaneously stored in the storage device.

52. A mobile device comprising:
a user-interactive display;
a processor;
a storage device coupled to the processor and having instructions stored thereon, which, when executed by the processor:
cause a setup screen to be presented on the user-interactive display, and
cause the processor to configure the mobile device to be an access point for a wireless network in accordance with a configuration request received through the setup screen; and
a communication interface coupled to the processor and operable for receiving an access request from a first requesting device, and for coupling the first requesting device to the wireless network in response to the access request;
where the instructions, when executed by the processor, are further operable to cause the processor to lock down the mobile device to prevent access to the wireless network by another requesting device when a number of devices currently coupled to the wireless network through the mobile device equals a predetermined number of devices.

53. The mobile device of claim 52, wherein the instructions, when executed by the processor, are further operable to cause the setup screen to be presented automatically in response to receiving a signal from the first requesting device.

54. The mobile device of claim 52, wherein the instructions, when executed by the processor, are further operable to cause the processor to send a message to the first requesting device indicating that access has been granted, and to send a message to the another requesting device indicating that access has been prevented.

55. A method comprising:
presenting a setup screen on a user-interactive display of a mobile device;
receiving a configuration request through the setup screen;

configuring the mobile device to be an access point for a wireless network in accordance with the received configuration request;
receiving, at the mobile device, an access request from a first requesting device;
coupling, by the mobile device, the first requesting device to the wireless network in response to the access request; and
locking down the mobile device to prevent access to the wireless network by another requesting device when a number of devices currently coupled to the wireless network through the mobile device equals a predetermined number of devices.

56. The method of claim 55, wherein presenting the setup screen occurs automatically in response to receiving a signal from the first requesting device.

57. The method of claim 55, further comprising:
sending a message to the first requesting device indicating that access has been granted; and
sending a message to the another requesting device indicating that access has been prevented.

58. A mobile device comprising:
a display;
a processor;
a storage device coupled to the processor and having instructions stored thereon, which, when executed by the processor, cause the processor to configure the mobile device to be an access point for a wireless network; and
a communication interface coupled to the processor and operable for receiving an access request from a first requesting device, and for coupling the first requesting device to the wireless network in response to the access request;
where the instructions, when executed by the processor, are further operable to:
cause the processor to identify on the display the first requesting device currently coupled to the wireless network through the mobile device, and
lock down the mobile device to prevent access to the wireless network by another requesting device when a number of devices currently coupled to the wireless network through the mobile device equals a predetermined number of devices.

59. A method comprising:
configuring a mobile device to be an access point for a wireless network;
receiving, at the mobile device, an access request from a first requesting device;
coupling, by the mobile device, the first requesting device to the wireless network in response to the access request;
identifying on a display of the mobile device, the first requesting device currently coupled to the wireless network through the mobile device; and
locking down the mobile device to prevent access to the wireless network by another requesting device when a number of devices currently coupled to the wireless network through the mobile device equals a predetermined number of devices.

* * * * *